Inventor
Daniel R. Hiskey
By Lyon & Lyon
Attorneys

Patented Nov. 3, 1931

1,829,831

UNITED STATES PATENT OFFICE

DANIEL R. HISKEY, OF SAN GABRIEL, CALIFORNIA, ASSIGNOR OF ONE-FOURTH TO McRAE PAINT PRODUCTS, INC., OF LOS ANGELES, CALIFORNIA, A CORPORATION OF CALIFORNIA

PIPE PAINTING APPARATUS

Application filed June 26, 1928. Serial No. 288,394.

This invention relates to a simple portable apparatus by means of which pipes of various diameters may be painted or coated with suitable materials in fluid or plastic condition without necessitating lifting the pipes completely off the ground or other support. The invention is particularly directed toward an apparatus capable of coating or painting pipes suitable for public utility purposes such as gas or water distribution pipes when such pipes are laid in a ditch or cut or alongside such ditch awaiting joining or final placement.

An object of this invention is to disclose and provide an apparatus whereby pipe or other long objects may be painted or coated rapidly and thoroughly with one passage of the apparatus over the pipe.

Another object is to disclose a portable pipe painting apparatus.

Another object is to disclose a portable pipe painting apparatus capable of painting a pipe completely over its outer surface while the pipe is resting on any suitable support.

Other objects, advantages or functions of my invention will become apparent from the following detailed description of my apparatus and the combination of elements embraced thereby, one form of the invention being described in detail for purposes of illustration only. The invention is not to be limited to the particular construction shown and described herein, but embracing numerous changes and modifications, coming within the skill of those in the art, which may be made therein and are embraced by the claims appended hereto.

Heretofore, pipe painting apparatus or other like machines have been invented and a protective paint or other composition applied to the outer surface of the pipes and the like by means of brushes, swabs and the like, but such machines have been bulky, not portable and necessitating lifting and passing the pipe through a stationary machine. This automatically prevented the use of a machine on a completed or joined pipe line. Furthermore, although pipe can be coated or painted in a pipe yard by such pipe machines, such painted pipe have their coatings broken, scraped and otherwise impaired during the subsequent steps of delivery to a job and actual joining and laying.

As has been stated before, this invention relates to a portable pipe painting device or apparatus whereby pipe may be coated or painted with a portable protective composition even though the pipe has been joined to form a pipe line, as in the bottom of a suitable ditch. In brief, the apparatus embraced by this invention comprises a yoke adapted to be placed upon a pipe, nozzles mounted on the yoke and means for supplying a suitable paint or other composition, preferably under pressure, to the nozzles.

In the appended drawings showing one form of my invention,

Figure 1:
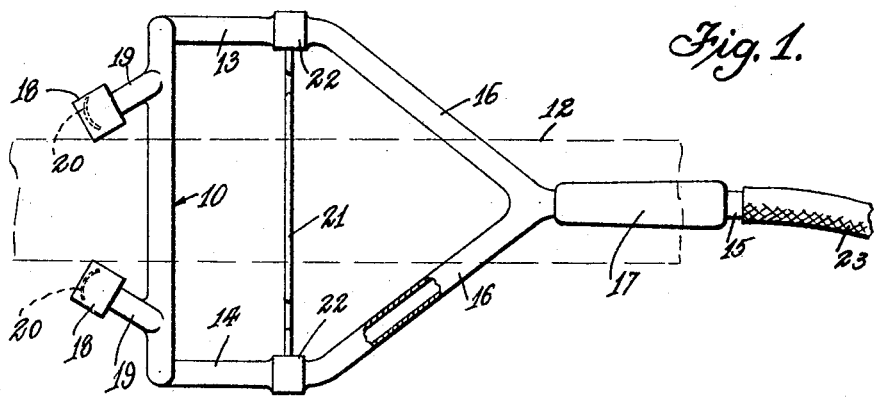
Fig. 1 is a plan view of the pipe painting machine partly in section, the machine being placed in position upon a pipe.

Referring to the drawings, the apparatus illustrated therein consists of a hollow yoke 10 having the form of an incomplete circle. The yoke need not be circular, necessarily, however, and as shown in the drawing the yoke 10 consists of an octagonal shape having one of the sides removed. The ends 11 of the yoke are closed in any suitable manner and the distance between said ends 11 is sufficient to admit a pipe 12 which it is desired to paint or coat with a suitable composition. In all instances, however, the yoke 10 should be of sufficient length so as to cover more than one-half of the circumference of the pipe 12.

A plurality of pipe means such as 13 and 14, for example, are connected to the yoke 10 and extend, preferably, at right angles to the plane in which the yoke 10 lies. The pipe means 13 and 14 are connected to a common pipe line 15 by means of a Y connection 16.

Figure 3:
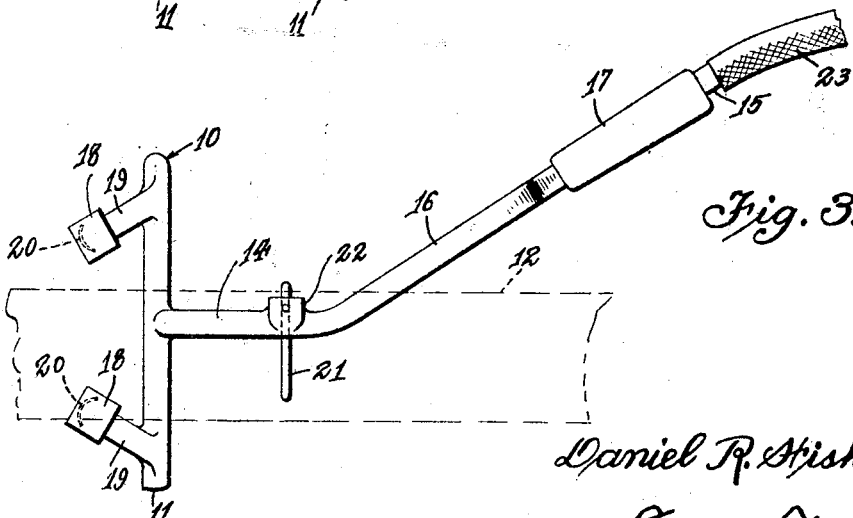
Fig. 3 is a side elevation of the apparatus shown in Fig. 1.

The Y connection preferably makes an angle with the plane in which the yoke 10 lies as shown in Fig. 3 and a suitable handle 17 may be formed near the upper end of the yoke or around the pipe means 15.

Figures 2, 4:
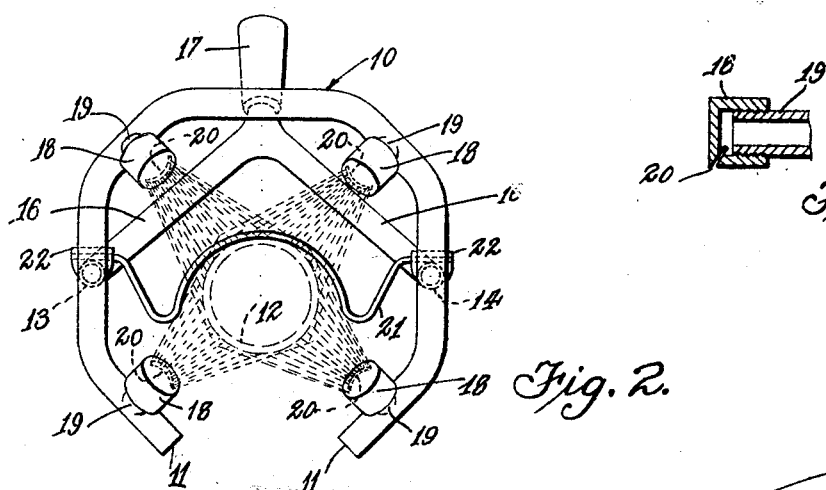
Fig. 2 is a front elevation of the apparatus shown in Fig. 1.
Fig. 4 is an enlarged axial section through one of the nozzles shown in Figs. 1 to 3.

A plurality of nozzles 18 may be mounted upon the yoke 10, the openings or apertures in the nozzles 18 being of sufficient size and so directed as to discharge a fluid substantially completely around the pipe 12 as shown in Fig. 2. Any suitable type of nozzle may be used, although it has been found that the nozzles shown in the drawings and particularly in Fig. 4 are extremely simple, readily changed and adjusted and very satisfactory. The nozzle may consist of a cap 18 attached by means of screw threads to a short nipple 19 which, in turn, is connected to the yoke 10. The cap 18 may have a slot 20 cut therein, the curvature of the cap 18 causing a fan-shaped stream of fluid to be discharged from the slot 20 when the apparatus is in operation.

In order to position the pipe 12 to be painted centrally within the yoke 10, a suitable support 21 is employed, said support being connected to the pipe means 13 and 14. As shown in the drawings the support 21 may be made of wire of sufficient strength to support the yoke 10 and connected parts, the ends of the support 21 being pivoted in collars or bosses 22 made in or mounted upon the pipe means 13 and 14. The support 21 may be rigidly mounted in the bosses 22 if this is desired, and instead of causing the support 21 to rest directly upon the pipe 12 suitable rollers may be mounted upon the support 21 so as to cause a rolling contact between the support and the pipe 12.

In operating the device when it is desired to paint or coat a pipe line such as for example, the pipe line 12 with a protective composition, the yoke 10 is placed transversely upon the pipe line, the pipe 12 passing through the opening between the ends 11 of the yoke 10. In this manner it is not necessary to start the pipe painting operation at the end of a pipe line, but any section of the pipe may be painted if this is desired. The pipe line 12 then comes in contact with the support 21 positioning the pipe line centrally of the yoke 10 and the nozzles 18. A suitable paint or other protective composition is then supplied to the apparatus by means of a flexible hose connection 23 attached to the pipe line 15 which in turn conducts the paint or other composition through the Y 16, pipe lines 13 and 14, to the hollow yoke 10. From the yoke, the paint or other composition is distributed uniformly through nipples 19 to the nozzles 18 so that a plurality of streams of paint are simultaneously applied upon the pipe line 12 and the entire outer surface of the pipe line is coated simultaneously. The operator may then walk along the pipe line 12 pulling or pushing the apparatus by means of the handle 17 so that great lengths of pipe may be rapidly and completely painted. The length and angle assumed by the connection 16 and pipe line 15 may be changed so as to enable the apparatus to be easily manipulated whether the pipe is laid upon horses or other supports above the ground or whether the pipe line reposes in the bottom of a ditch. It is preferably to have the yoke 10 lie in a plane at right angles to the axis of the pipe line 12. When the apparatus comes to a point along the pipe line where the pipe line is resting upon a support, it may be easily raised and moved over the obstruction, the larger portion of the pipe being painted during this operation and only a small spot on which the pipe is resting being unpainted.

If the pipe is raised but a trifle, however, the entire surface may be painted at those supports.

It will be apparent that great lengths of pipe may be covered with a protective composition by means of my apparatus with a minimum number of operators. In practice, the supply of protective composition may be carried upon a suitable vehicle adapted to run by the side of the ditch or other location of the pipe. The vehicle may also carry a suitable pump so as to introduce the protective composition under pressure into the pipe line 23 and thereby supply such composition to the nozzles 18. I have found that atomization of a protective composition such as a fluid or heated asphaltic composition may be readily accomplished by using compressed air as a means of developing pressure and simultaneously atomizing the paint. This step of atomization may be carried out to great advantage by introducing the paint under pressure into a chamber having a constricted air discharge nozzle therein pointed in the direction of an outlet pipe which leads to the flexible pipe supply means 23. This form of air ejector not only atomizes the paint or other composition but imparts sufficient pressure to the composition so as to carry it for long distances without great coalescence.

In view of the fact that pipe lines may have become coated with dirt and other matter before they are painted, it is desirable to have such dirt removed before a coating of protective composition is applied. In order to facilitate this operation a plurality of brushes may be attached to the apparatus shown in the drawings slightly in advance of the nozzles so that movement of the entire apparatus longitudinally of a pipe line first cleans adhering foreign matter from the pipe line by means of the brushes and then coats said pipe line with a protective composition.

Furthermore, the nozzles may be in duplicate so that two successive coats may be applied simultaneously by one passage of the apparatus down a pipe line.

As has been stated before, numerous changes and modifications may be made without departing from my invention. Various types of nozzles may be employed and the number and location of the supply pipes may be materially altered. All such changes and modifications come within the scope of the following claims.

I claim:

1. A pipe painting apparatus comprising a hollow yoke in the form of an incomplete circle, the ends of said yoke being spaced from each other to permit a pipe to be treated to pass therebetween, means for supplying a fluid to said yoke, means for directing a fluid from said yoke upon a pipe to be treated centrally thereof, fluid directing means adjacent the ends of said yoke being spaced from each other a distance substantially equal to the distance separating the ends of said yoke, and means for supporting and spacing said yoke in operable position upon a pipe.

2. A portable pipe painting machine comprising a hollow yoke adapted to be slipped transversely upon a pipe, said yoke being in the form of an incomplete circle, the ends of said yoke being spaced from each other to permit a pipe to be treated to pass therebetween, pipe means connected to said yoke at a plurality of points, a common flexible fluid supply means connected to said pipe means, a handle connected to said pipe means for guiding the apparatus and a plurality of nozzles mounted upon said yoke and adapted to direct a fluid upon the outer surface of the pipe to be treated, nozzles adjacent the ends of said yoke being spaced from each other a distance substantially equal to the distance separating the ends of said yoke.

3. A portable pipe painting apparatus comprising a hollow yoke adapted to be slipped transversely upon a pipe and to cover more than one-half of the circumference thereof, the ends of the yoke being spaced from each other to permit pipe to be treated to pass therebetween, means operably connected to said yoke for supporting and spacing said yoke circumferentially about a pipe placed within said yoke, said yoke being provided with a plurality of fluid directing means adapted to direct fluid from said yoke onto a pipe placed therein, fluid directing means adjacent the ends of said yoke being spaced from each other a distance substantially equal to the distance separating the ends of said yoke, pipe means operably connected to said yoke at a plurality of points, and adapted to form a handle whereby the apparatus may be moved, and means for supplying treating fluid through said last named pipe means.

Signed at Los Angeles, Calif., this 20th day of June, 1928.

DANIEL R. HISKEY.